Feb. 24, 1970  A. F. MARDIAT, SR  3,497,093
SAFE DELIVERY SYSTEM AND VEHICLE THEREFOR
Filed May 27, 1968  2 Sheets-Sheet 1

INVENTOR.
ARTHUR F. MARDIAT, SR.

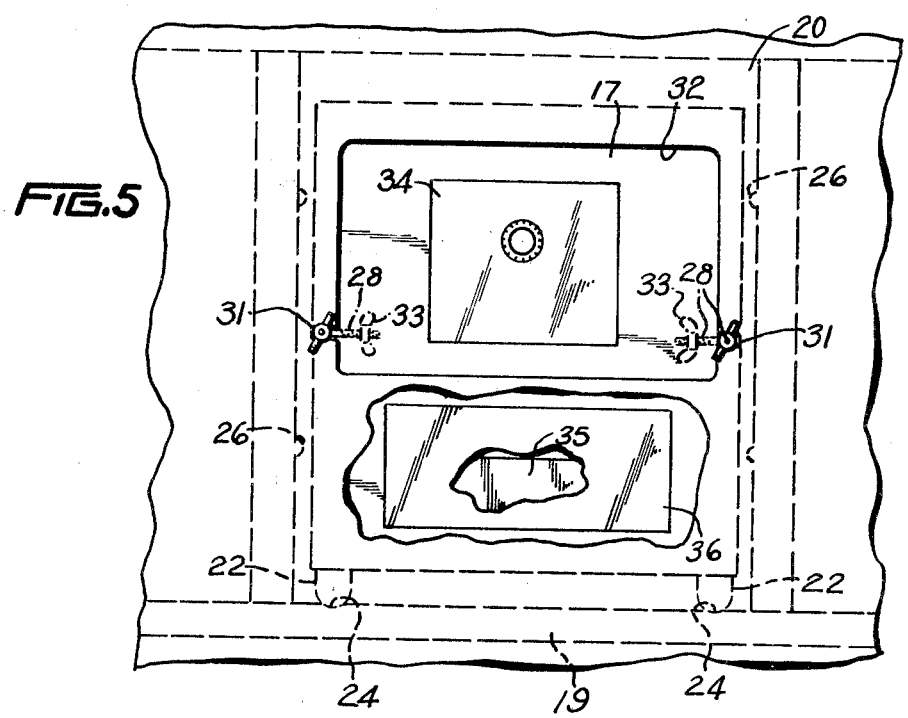
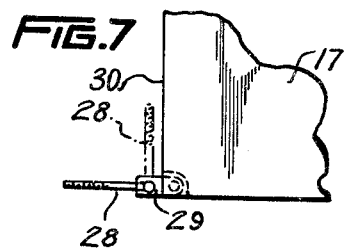
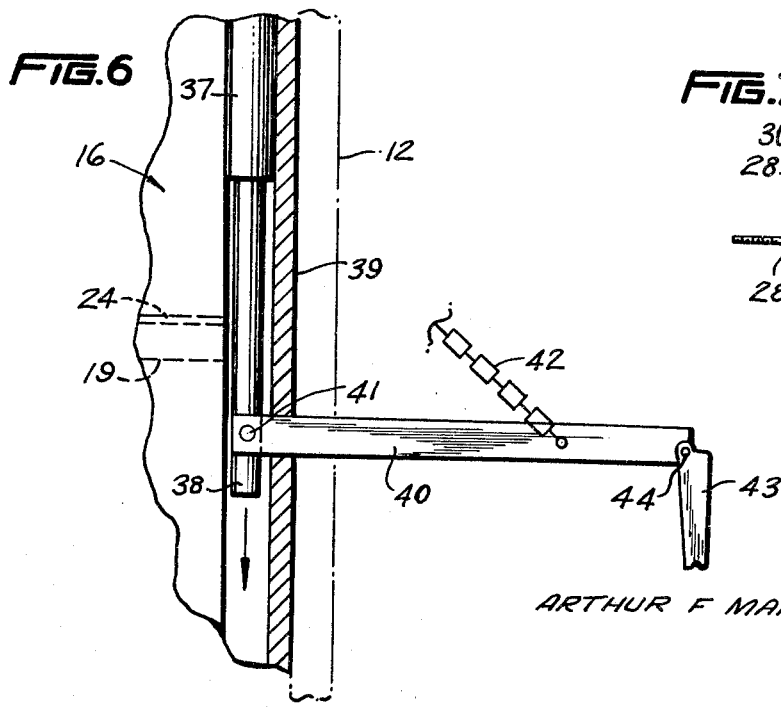

United States Patent Office 3,497,093
Patented Feb. 24, 1970

3,497,093
SAFE DELIVERY SYSTEM AND VEHICLE THEREFOR
Arthur F. Mardiat, Sr., 831 E. Bay Drive,
West Islip, N.Y. 11795
Filed May 27, 1968, Ser. No. 732,437
Int. Cl. B60p 1/46
U.S. Cl. 214—515      5 Claims

ABSTRACT OF THE DISCLOSURE

An armoured vehicle for the delivery of safes having a vault within which the safe is secured in a stationary position. The exterior of the vehicle includes a hinged door which when open allows for the raising and lowering of a hydraulically operated, electrically operated, or manually operated platform and ramp; the ramp being hinged to the platform to allow the safe to roll onto the sidewalk.

---

This invention relates to armoured vehicles, and more particularly to a safe delivery system and vehicle therefor.

It is therefore the main purpose of this invention to provide a safe delivery system in which the safe is of such construction so as to be a vault within the vehicle.

Another object of this invention is to provide a safe delivery system access to the safe contents may be had for an opening from within the safe.

Still another object of this invention is to provide a safe delivery system which will have a hydraulically or otherwise operated platform and associated ramp allowing for the safe to be pulled upon the platform and then rolled onto the sidewalk or another platform.

Still another object of this invention is to provide a safe delivery system which will have wheels which extend rearwardly of the safe allowing for the safe to be easily pulled up steps and the like.

Yet another object of this invention is to provide a safe delivery system which will have an enclosed dry battery operated transmitter which will produce a carrier-wave upon which will ride a signal of police band frequency.

Other objects of this invention are to provide a safe delivery system which is simple in design, inexpensive to manufacture, rugged in construction, easy to use and efficient in operation.

These and other objects will become apparent upon a study of the following specification together with the accompanying drawing wherein:

FIGURE 4 is a diagrammatic side view of the safe showing how it is navigated upstair steps or the like;

FIGURE 5 is an enlarged fragmentary view taken along the lines 5—5 of FIGURE 3;

FIGURE 6 is a fragmentary side view of the platform and one of the hydraulic cylinders for raising and lowering the platform and its associated ramp; and FIGURE 7 is a fragmentary top plan view of the safe showing the method of folding the locking bolts.

Figure 1:
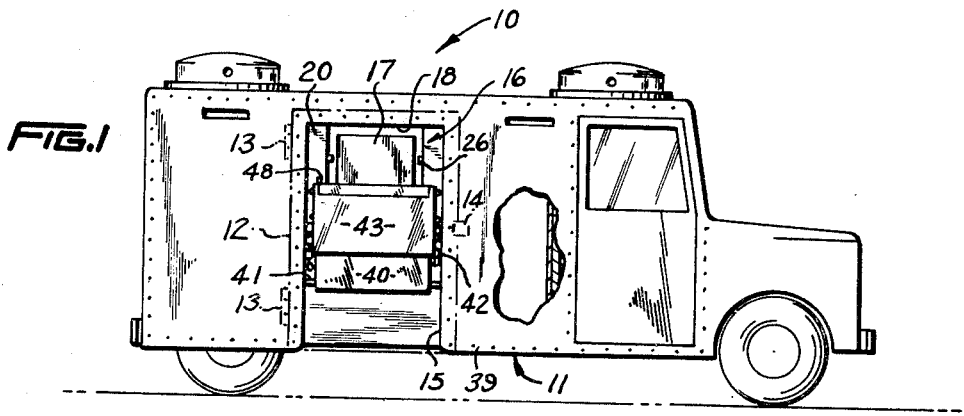
FIGURE 1 is a side view of a truck incorporating the present invention, with the outside door shut and the side wall shown partly broken away.
Figure 2:
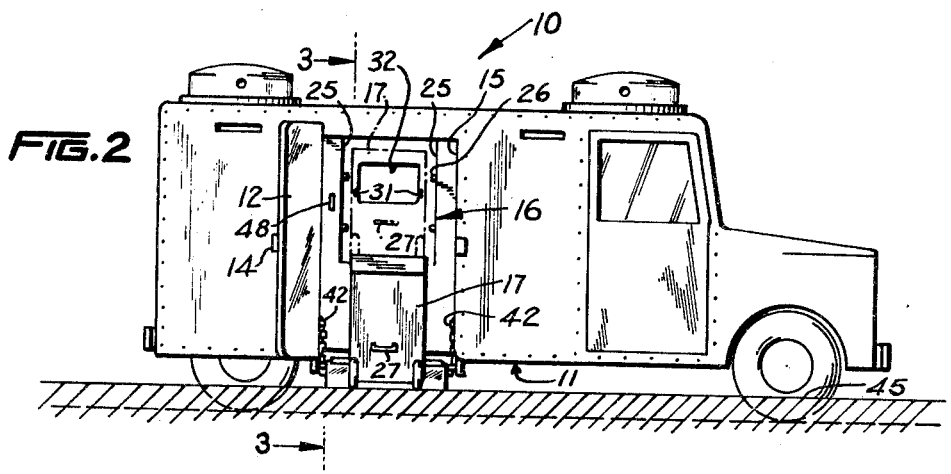
FIGURE 2 is similar to FIGURE 1, but showing the platform lowered to sidewalk level in order to facilitate removing the safe from tis vault on the interior of the truck.
Figure 3:
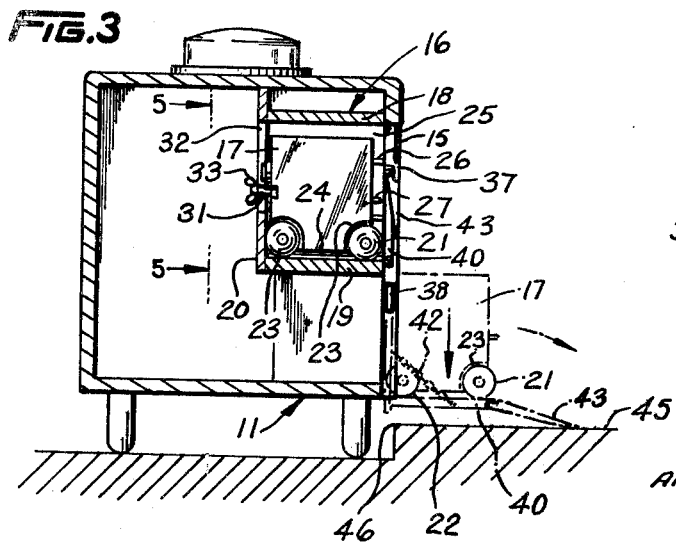
FIGURE 3 is a cross-sectional view taken along the lines 3—3 of FIGURE 2 with the lowered position of the safe shown in phantom lines.
Figure 4:
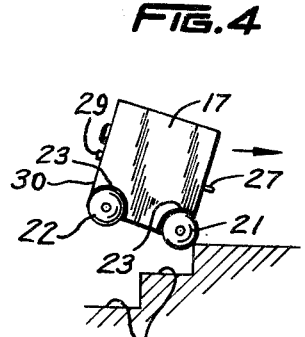

According to this invention, an armoured car safe delivery system 10 is shown to include the armoured vehicle body 11 having a hinged door 12 (shown in phantom lines). A pair of hinges 13 secure door 12 to body 11 and a lock 14 provides a means of securing door 12 closed. Door 12 closes over the opening 15 of body 11 and allows access to the internal vault 16 which houses the safe. Vault 16 is defined by a top wall 18, bottom wall 19 and rear wall 20 which are secured to the interior surfaces of vehicle body 11. Safe 17 is provided with an overhang at one end and is provided with wheels 22 which are flush with the front end. Wheels 21 and 22 are positioned so that there is sufficient clearance underneath safe 17 and they are rotatable within wells 23. The weel wells 23 allows the wheels 21 and 22 to be flush with the side of safe 17 so as not to cause an obstruction within the vault 16. Wheels 21 and 22 lie within the channels 24; the channels 24 provide guide means for safe 17. The side walls of vault 16 are provided with extending and parallel guide rails which serve the purpose of preventing friction by the side walls of the safe 17 against the side walls 25 of vault 16 when placing or removing the safe from the vault. Safe 17 is also provided with a handle grip 27 allowing for it to be easily pulled along any surface. A pair of threaded and pivotable bolts 28 are carried within lugs 29 extending from the face 30 of safe 17. Bolts 28 serve as a means of rendering safe 17 stationary within vault 16 by being rotated or pivoted into slot 31 extending away from the edges of opening 32 through wall 20 of vault 16. When bolts 28 are placed into slots 31 the winged nuts 33 are then tightened down against rear wall 20 and will securely hold safe 17 stationary. The opening 32 through rear wall 20 of vault 16 allows access to the safe door 34 from the interior of the vehicle body 11. A transmitter 35 within safe 17 is accessible to by means of door 36 of safe 17. The transmitter 35 is dry batteried powered and emits a signal on a carrier wave of police band frequency.

It will be noted that before safe 17 is closed for delivery, the transmitter 35 is turned on and the door 36 is closed. Transmitter 35 allows for safe 17 to be located by the police through the use of suitable direction finding electronic equipment. A pair of hydraulic cylinders 37 having telescoping rod portions 38 are secured behind the armoured vehicle's side wall 39. A folding platform 40 is secured by pivot pins 41 to the telescoping rod portion 38 and is held by means of chains 42 in order that safe 17 may be rolled from vault 16 onto platform 40. Platform 40 has a ramp portion 43 which depends from pins 44 jutting from the end of platform 40. When nuts 33 are loosened and bolts, safe 17 can then be pulled onto platform 40 by means of its handle grip 27, the platform 40 being level with the bottom wall 19 of vault 16. When the hydraulic cylinders 37 are activated the telescoping end portions 38 travel downwards, thus lowering safe 17, and the ramp portion 43 then touches the sidewalk 45 and the ramp portion 43 allows for safe 17 to be rolled smoothly downwards upon sidewalk 25 when the armoured vehicle is at the curb 46.

It shall further be noted that the wheels 21 extend rearwardly of safe 17 in order to facilitate the rolling of safe 17 up and down steps.

Safe 17 is secured into position within vault 16 after lifting it by means of the hydraulic cylinders 37. The platform 40 and its associated ramp portion 43 are placed manually whereupon latch 48 is pivoted over it to prevent it from unfolding. After latch 48 is pivoted into position, door 12 is closed and locked.

What I now claim is:

1. An armoured vehicle safe delivery system comprising a vault in the body of the armoured vehicle providing containment and locking means for a safe containing money and securities, a transmitter carried within said safe providing a means for locating said safe if stolen, a folding platform and ramp with raising and lowering means to place said safe in or out of said vault of said vehicle with wheel means carried by said safe so that is can roll upwards or downwards of steps or the like.

2. The combination according to claim 1 wherein said vault for receiving said safe comprises a top wall, a bottom wall, a rear wall and a locking door on the outside of the side panel of the vehicle, said door allowing for the insertion of and removal of said safe from said vault within said vehicle body.

3. The combination according to claim 2 wherein said side walls of said vault within said vehicle is provided with parallel guide rails, said guide rails preventing possible friction with exterior of the side of the safe and the inside surfaces of said side walls of said vault and parallel channels on the top surface of said bottom wall of said vault provides guide means for the front and rear wheels of said safe in order to properly align pivotal bolts on the face of said safe with U-shaped openings with the edges of the openings in the rear wall of said vault; said U-shaped openings freely receiving said bolts to which are threaded winged nuts; said winged nuts serving to secure said safe stationary within said vault and said transmitter within the lower portion of said safe is accessible to by a locking door in order to turn said transmitter on, said transmitter producing a radio signal on a carrier wave that has a police band frequency in order that law enforcement direction finding equipment may be used through triangularization to locate said safe if it is unlawfully removed from armoured vehicle.

4. The combination according to claim 3, wherein said platform which is used to raise and lower said safe is secured by pivot means to the device and is supported in in a horizontal position by a chain on each side, one end of said chain being secured to said platform and the other end of said chain being secured to the elevatable lifting apparatus of said armoured vehicle and said ramp portion of said platform is pivotably secured to the outwardly extending end of said platform and depends downward when released by latch means from the unfolded platform so that when it strikes the ground it will automatically extend outward in order to allow for the smooth rolling of said safe from said platform to said sidewalk when said armoured vehicle is at the curb of said sidewalk.

5. The combination according to claim 4 wherein access to the contents of said safe is accomplished through an opening in the rear wall of said vault when desired when said safe is secured within said vault, and said wheels of said safe are rotatable within wells at the lower extremity of said safe allowing sufficient clearance at the bottom of said safe between the sidewalk and said wells allows said wheels to be flush with the sides of said safe and one pair of said wheels extend rearwardly of said safe in order to allow said safe to be rolled up or down steps and the like by the use of a handle secured to the rear of said safe and said platform and its associated ramp portion are folded up manually towards the entrance opening of said vault and latch means secured to the panel area is pivoted downwards to hold said folded platform ramp portion in an upward position in order that said door may be closed and locked to seal said vault on the interior of said armoured vehicle.

References Cited
UNITED STATES PATENTS

| | | | |
|---|---|---|---|
| 1,649,535 | 11/1927 | Liebel | 214—38 |
| 2,619,921 | 12/1952 | Stelter | 109—39 X |
| 3,368,704 | 2/1968 | Pope | 214—75 |

ALBERT J. MACKAY, Primary Examiner

U.S. Cl. X.R.
109—38; 214—75